March 17, 1959

R. E. JONES 2,877,904

TIE RACK

Filed Sept. 10, 1956

INVENTOR.
RALPH E. JONES

BY Lyon & Lyon

ATTORNEYS

United States Patent Office 2,877,904
Patented Mar. 17, 1959

1

2,877,904

TIE RACK

Ralph E. Jones, San Diego, Calif.

Application September 10, 1956, Serial No. 608,983

2 Claims. (Cl. 211—100)

This invention relates to a tie rack and more particularly to a necktie rack having two positions, in one of which the neckties are displayed for ready access, and in the other of which the neckties are neatly folded without wrinkling and locked to prevent accidental displacement.

It is accordingly one object of this invention to provide a novel, inexpensive necktie rack.

It is a further object of this invention to provide a necktie rack of the type described having simple and inexpensive locking means for securing the neckties thereon, readily openable to provide access to the ties being supported.

It is a further object of this invention to provide a rack which, although it occupies a surprisingly small amount of space, will easily hold and keep two or three dozen neckties in perfect condition and yet have them instantly accessible.

It is a further object of this invention to provide a device of the type described which can be made chiefly of plastic or wood or entirely of metal; however, plastic is preferred.

These and other objects, features and advantages of the present invention will be apparent from the annexed specification in which.

Figures 1, 2, 3, 4, 5:
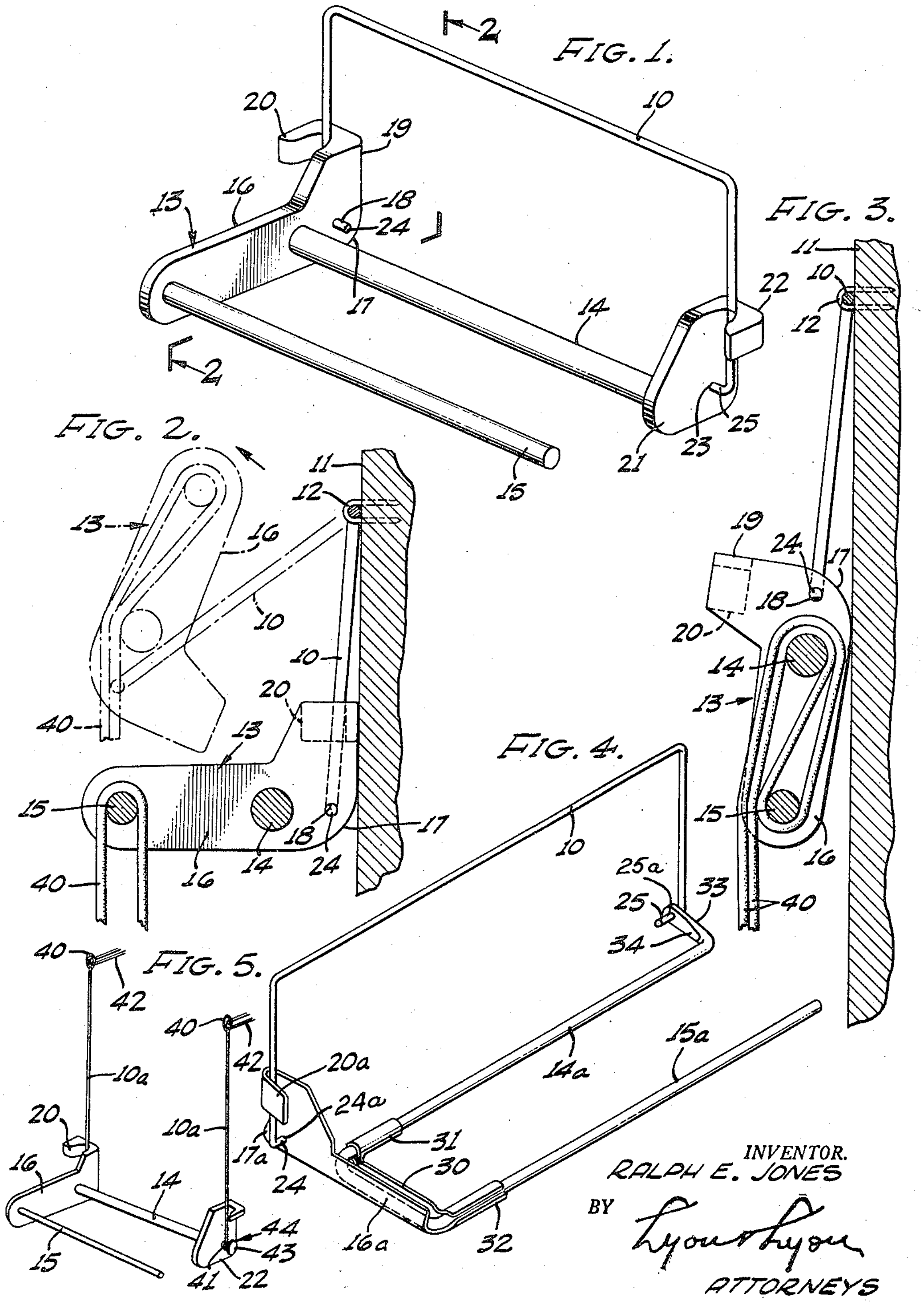
Figure 1 is a perspective elevation of one embodiment of the present invention in the open position.
Figure 2 is a sectional view taken along the line 2—2 of Figure 1.
Figure 3 is a view similar to Figure 2 showing the device in the closed position.
Figure 4 is a perspective elevation of an alternative embodiment of the present invention.
Figure 5 is a perspective elevation of another embodiment of the invention.

Referring now more particularly to the drawings and particularly to Figures 1 through 3, there is indicated a bail 10 adapted to be secured to any suitable vertical surface but preferably to the inner face of a man's closet door. The bail is secured by means of a plurality of staples 12, normally two. The staples should not be driven into tight engagement with the bail and so interfere with the bail's free and easy swinging outwardly from the door as shown in phantom in Figure 2.

A rod assembly 13 is provided including a pair of parallel spaced rods 14 and 15 joined together at one end by a spacer 16. Spacer 16 is extended rearwardly as at 17 to provide a bearing by simply forming a hole 18 in the spacer. It is also extended upwardly as at 19 and has a hook 20 formed thereon to provide a stop. The other end of rod 14 carries a member 21 which is extended upwardly and provided with a hook 22 similar to the hook 20. The member 21 is also bored as at 23 to provide a hole and thus form the other bearing for cooperating with the inwardly bent ends 24 and 25 of bail 10.

While there has been shown two hooks 20 and 22, it will be obvious that one is sufficient, and it will be noted

2 that in the embodiment of Figure 4, only one has been shown.

In the embodiment shown in Figure 4, the device is made entirely of metal and like members have been assigned to like elements, thus a bail 10 having a web, arms and inwardly bent ends 24 and 25 which is entirely interchangeable with the bail 10 of Figures 1 through 3 is employed. Again a rod assembly, comprising spaced parallel tubular rods **14*a* and 15*a*, joined by a spacer 16*a* which is extended rearwardly as at 17*a* and carries a hook 20*a*, is employed. The spacer 16*a* is shown as comprising a plate bent upwardly as at 30 to form a channel and bent around the rods 14*a* and 15*a* as at 31 and 32. To form the bearing 33, rod 14*a* is merely bent rearwardly, flattened as at 34 and drilled to accommodate pin 25. Holes 24*a* and 25*a* accommodate the inwardly bent ends 24 and 25**.

The operation of the above-identified device is as follows: With the tie rack affixed to the door or other vertical surface and placed in the position shown in Figure 1, the ties 40 are hung loosely at their centers on rod 15. The first layer is normally placed with the ties edge to edge; then other layers are added in accordance with the number of ties. The adding of ties to rod 15 or their removal is facilitated in this open position by the fact that the right end of rod 15 is open. To close the rack and lock the ties for storage, the rod 15 is lifted upwardly, pivoted about its junction with the bail 10, and is rotated inwardly through the bail 10 and downwardly to the closed position shown in Figure 3. Thus doubled and folded, the ties are held in place securely. Neither the swinging of the door nor the blowing of a stiff breeze, as from an electric fan, can dislodge the ties.

To open the device, rod 14 is pulled away from the vertical surface 11, rod 15 is raised extensively while moving closely to the said vertical surface, the continued rotation of the rod assembly causes rod 15 to pass through the bail 10, and the rod assembly again reaches the horizontal position as in Figure 1 where the hooks 20 and 22 engage, prevent further rotation, and support rod 15 at the level of rod 14.

The space between the axis of the bearings 18 and 23 and the axis of the nearest rod, rod 14, is an important factor in the functioning of this device. The weight of thirty or so ties hung in layers on rod 15 tends to rotate the rod assembly to the open position when undesired, which, if it should often occur, would destroy the value of the rack. There are two considerations that jointly guard successfully against such an undesirable and unintended opening rotation. One is the pressure that the vertical surface 11 exerts against the ties at points well below rod 14. The other is that the offset of the axis of the trunnions 18 and 23 from the axis of the nearest rod augments greatly the leverage and effectiveness of the said pressure against the ties. If the said offset were too great, the rack would be unnecessarily difficult to operate. If the said offset were too slight, the rack would come open by itself many times when not desired.

The bail 10 is preferably one simple piece of bent stiff wire, but having enough flexibility to permit its assembly to or disassembly from the rod assembly without undue difficulty.

Referring now more particularly to Figure 5, there is shown an alternative embodiment in which like parts are given like numbers. This embodiment differs from the embodiment of Figure 1 in that the bail 10 is eliminated and replaced by a pair of cable-like flexible supports **10*a*, each comprising a cable with eyes 40 and 41 at each end. The eyes 40 are affixed to the wall by staples 42 and the eyes 41 are snapped over the enlarged heads 43 of studs 44. The hooks 20 and 22** engage the cables when the device is in the open position as shown in Figure 5.

While there has been described what is at present considered the preferred embodiment of the invention, it will be understood that various changes and alterations may be made therein without departing from the essence of the invention and it is intended to cover herein all such changes and alterations as come within the true scope and spirit of the annexed claims.

I claim:

1. A rack for neckties and the like comprising: a rod assembly having two ends and a rod assembly supporting means in which the said supporting means is pivotally attachable to a vertical surface and is also pivotally attached to each of the two ends of the said rod assembly, thus permitting the said rod assembly to swing against or away from the said vertical surface and to rotate about its pivotal junctions with the said supporting means; said rod assembly comprising two rods substantially parallel to each other and rigidly joined together by a spacer at one end; the pivotal junctions of said rod assembly with said supporting means being located adjacent the two ends of one of said rods; means between said rod assembly and said supporting means to stop the said rod assembly from further rotation in one direction when the two said rods are substantially in a horizontal plane, the inner rod being relatively close to said vertical surface, while the other rod having an open end is farther from said vertical surface; said open end rod being revolvable upwardly, then toward the said vertical surface, and then downwardly, so as to wrap any ties that may have been hanging on said open end rod around the other rod and against themselves and so hold them with firmness and security.

2. A rack for neckties and the like as set forth in claim 1 wherein the inner rod at its end opposite said spacer is provided with a right-angled extension to receive one of said pivotal connections and wherein an extension of said spacer receives the other of said pivotal junctions, the axis of said pivotal junctions being substantially parallel to said rods and in substantially the same plane as said rods but spaced outwardly from said rods a distance less than the distance between said rods.

References Cited in the file of this patent

UNITED STATES PATENTS

| | | |
|---|---|---|
| 1,634,746 | Harris | July 5, 1927 |
| 1,717,981 | Kirshner | June 18, 1929 |
| 1,754,940 | Freeman | Apr. 15, 1930 |
| 1,770,190 | Andrews | July 8, 1930 |
| 1,858,653 | Willcox | May 17, 1932 |
| 2,645,355 | Evans | July 14, 1953 |